United States Patent Office 3,558,510
Patented Jan. 26, 1971

3,558,510
METHOD FOR RAISING THE AUTOGENOUS IGNITION TEMPERATURE OF CARBON DISULFIDE
David J. Miller, Gretna, and Tadeusz K. Wiewiorowski, New Orleans, La., assignors to Freeport Sulphur Company, New York, N.Y., a corporation of Delaware
No Drawing. Filed Jan. 23, 1967, Ser. No. 610,830
Int. Cl. C23g 5/02; E21b 43/00
U.S. Cl. 252—364                5 Claims

ABSTRACT OF THE DISCLOSURE

The autogenous ignition temperature of carbon disulfide can be elevated above that of pure carbon disulfide by incorporating an amount of from about 0.1% to about 10% by weight, preferably between about 0.2% and 5%, of an additive selected from the class consisting of iodine, bromine and ethyl alcohol.

---

This invention relates to the art of raising the autogenous ignition temperature of carbon disulfide. More specifically, the invention relates to methods for elevating the autogenous ignition temperature of carbon disulfide.

The advantage of the method of the invention resides primarily in increasing the safety of handling and using carbon disulfide, a common industrial solvent. Carbon disulfide is used as an industrial solvent in a wide variety of applications. It is used for dissolving residues from oil well casings and pipelines, for unplugging our gas wells obstructed by elemental sulfur, as a solvent in emulsion polymerization and in the production of nitrocellulose and polyvinyls, as well as many other uses.

The major drawback in the use of carbon disulfide is its extremely low autogenous ignition temperature. If carbon disulfide comes into contact with a surface whose temperature is 100° C. or above, it will burst into flames. Consequently, the handling of carbon disulfide is hazardous and requires special precautions.

There are compounds, which when added to carbon disulfide, are capable of raising the autogenous ignition temperature of carbon disulfide. When 20 percent by volume of carbon tetrachloride is added to carbon disulfide, the antogeneous ignition temperature of the mixture is raised to 141.6° C., as compared to 100° C. for pure carbon disulfide, as reported in "CS$_2$," published by Stauffer Chemical Company, 1964, page 18.

A disadvantage of the previously known methods of raising the autogenous ignition temperature of carbon disulfide lies in the fact that relatively large amounts of additives must be added to the carbon disulfide. The use of such large amounts of additives results in decreasing the effectiveness of the carbon disulfide as a solvent and frequently raises the cost of the product inordinately.

Many additives have been tried for the purpose of elevating the autogenous ignition temperature of carbon disulfide, without success. These include the carboxylic acids, organic amines, ketones, benzene, water, nitrobenzene, methyl mercaptan, sulfur dioxide and many others. Thus when additives were found which in small amounts elevate the autogenous ignition temperature of carbon disulfide, it was unexpected.

It is, accordingly, an object of this invention to provide new and useful methods for raising the autogenous ignition temperature of carbon disulfide.

It is another object of this invention to minimize the loss of solvent power of carbon disulfide while raising its autogenous ignition temperature.

It is also an object of this invention to provide additives which, when dissolved in small concentrations in carbon disulfide, effectively raise its autogenous ignition temperature.

Other objects of the invention will be apparent to those skilled in the art from reading the present description.

This invention provides new, convenient and useful methods for elevating autogenous ignition temperature of carbon disulfide. It has been found, surprisingly that when minor amounts of iodine, bromine or ethyl alcohol are added to carbon disulfide, they significantly raise its autogenous ignition temperature.

The objects of this invention may be achieved by introducing one or more of the above-described additives directly into liquid or vaporized carbon disulfide. The amount of additive used should be between about 0.1% and 10% by weight, and preferably between about 0.2% and 5% by weight. The additive chosen and the amount used may be varied depending on the particular requirements for the properties of the carbon disulfide. For example, if a relatively high autogenous ignition temperature is desired, a relatively large amount of additive should be employed. The additives may be used singly or in combination.

The preferred embodiment of this invention involves dissolving about 1% by weight of iodine in liquid carbon disulfide. The resulting solution has an autogenous ignition temperature of about 158° C. and solvent properties essentially identical with those of pure carbon disulfide.

The method for raising the autogenous ignition temperature of carbon disulfide of the present invention offers several distinct advantages over prior art. In contrast to the prior art, only relatively small amounts of the additive need be used to give significant changes in the autogenous ignition temperature. As a result, the solvent power of the carbon disulfide remains essentially unchanged.

In order more clearly to disclose the nature of the present invention, the following specific illustrative examples will be set forth. It should be understood, however, that this is done solely by way of example and is intended neither to delineate the scope of the invention nor limit the ambit of the appended claims. Parts are expressed in terms of parts by weight. Autogenous ignition temperatures as referred to herein were determined by the ASTM Method No. D286-58T, as described in the "1958 Book of ASTM Standards," Part 7, American Society for Testing Materials, Philadelphia, Pa., page 161.

EXAMPLE 1

One gram of iodine was added to 100 grams of liquid carbon disulfide. The autogenous ignition temperature of the solution was found to be above 158° C., rather than 100° C. for pure carbon disulfide.

EXAMPLES 2 AND 3

Other additives were tested for their effect on the autogenous ignition temperature of carbon disulfide and the results are presented in Table I below:

TABLE I

| Additive | | Percent (by weight) of additive | Autogenous ignition temperature, ° C. |
|---|---|---|---|
| Example: | | | |
| 2 | Bromine | 1.0 | >150 |
| 3 | Ethanol | 6.0 | >150 |

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A method of elevating the autogenous ignition temperature of carbon disulfide which comprises adding to the carbon disulfide between about 0.1% and about 10% by weight of an additive selected from the class consisting of iodine, bromine and ethyl alcohol.

2. A method according to claim 1 wherein the additive is iodine.

3. A method according to claim 1 wherein the additive is bromine.

4. A method according to claim 1 wherein the additive is ethyl alcohol.

5. A method of claim 1 wherein the additive is added in an amount of between about 0.2% and 5% by weight.

References Cited

UNITED STATES PATENTS 3,402,770  9/1968  Messenger _____ 166—40

HERBERT B. GUYNN, Primary Examiner

U.S. Cl. X.R.

23—206; 166—304; 252—8.55

UNITED STATES PATENT OFFICE
CERTIFICATE OF CORRECTION

Patent No. 3,558,510                    Dated January 26, 1971

Inventor(s) David J. Miller and Tadeusz K. Wiewiorowski

It is certified that error appears in the above-identified patent and that said Letters Patent are hereby corrected as shown below:

Column 1, line 32, the word "our" should be --sour--.

Signed and sealed this 11th day of May 1971.

(SEAL)
Attest:

EDWARD M. FLETCHER, JR.           WILLIAM E. SCHUYLER, J
Attesting Officer                Commissioner of Patent